(No Model.) 2 Sheets—Sheet 1.
D. R. BLACK & S. A. HILL.
MOLD FOR MAKING WASHERS AND TACKS FOR PLUMBERS' USE.
No. 527,931. Patented Oct. 23, 1894.
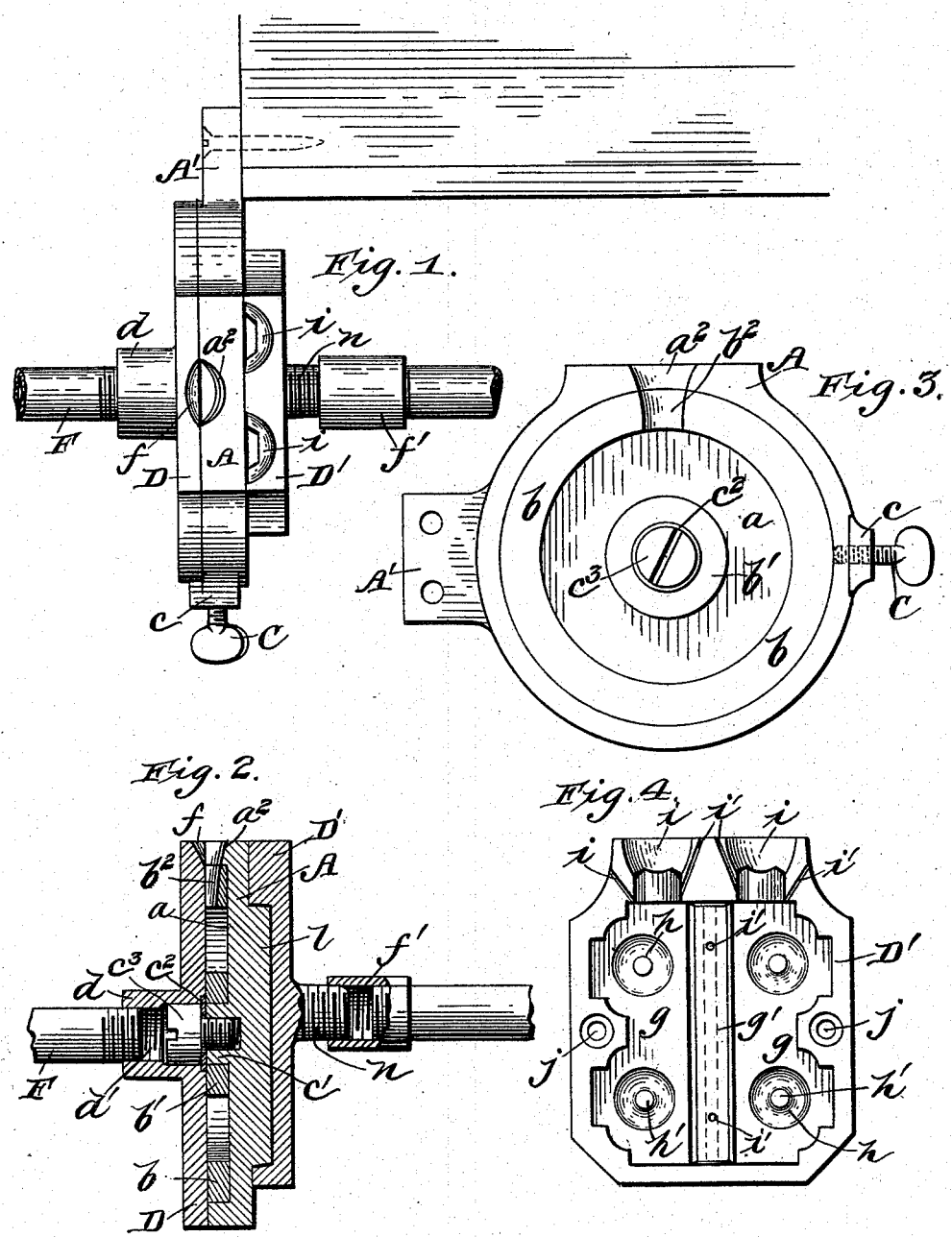

(No Model.) 2 Sheets—Sheet 2.

D. R. BLACK & S. A. HILL.
MOLD FOR MAKING WASHERS AND TACKS FOR PLUMBERS' USE.

No. 527,931. Patented Oct. 23, 1894.

UNITED STATES PATENT OFFICE.

DAVID R. BLACK AND STEPHEN A. HILL, OF DULUTH, MINNESOTA.

MOLD FOR MAKING WASHERS AND TACKS FOR PLUMBERS' USE.

SPECIFICATION forming part of Letters Patent No. 527,931, dated October 23, 1894.

Application filed December 23, 1893. Serial No. 494,596. (No model.)

*To all whom it may concern:*

Be it known that we, DAVID R. BLACK and STEPHEN A. HILL, citizens of the United States, residing at Duluth, in the county of St. Louis and State of Minnesota, have invented certain new and useful Improvements in Molds for Making Washers and Tacks for Plumbers' Use; and we do hereby declare the following to be a full, clear, and exact description of the invention, such as will enable others skilled in the art to which it appertains to make and use the same.

Our invention relates to improvements in molds, and has especially to do with molds for forming washers and pipe tacks for plumbers' use, and its objects are to mold both washers and tacks in a combined mold, and also to mold washers of different diameters and widths in the same mold. We attain these objects by the devices described and illustrated in the following specification and the accompanying drawings, in which—

Figure 5:
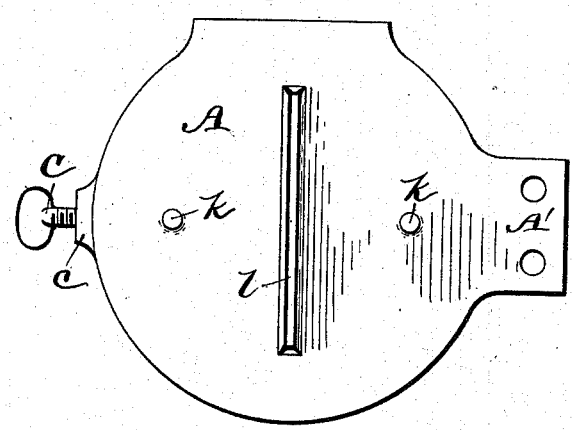
Figure 6:
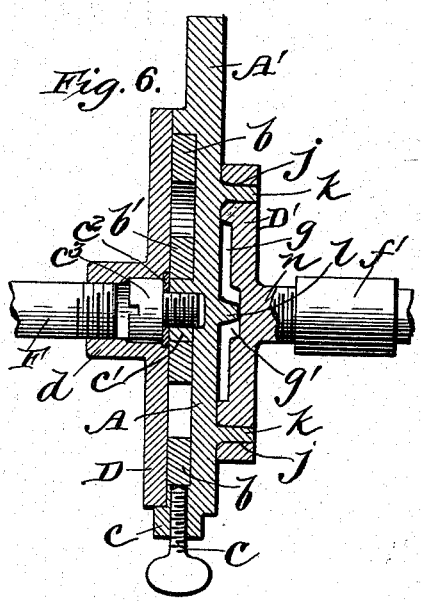
Figure 7:
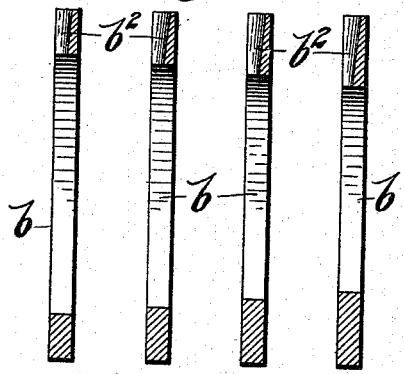
Figure 8:
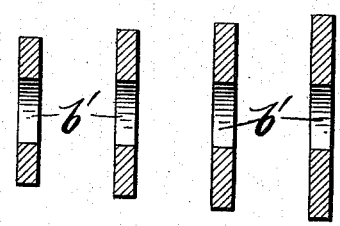
Figure 9:
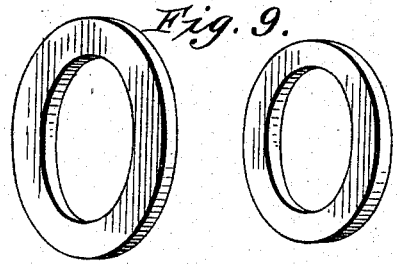
Figure 10:
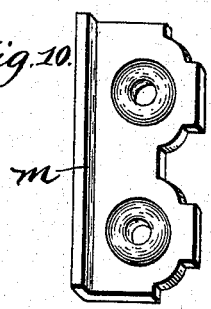

Figure 1. represents a top plan view of the devices embodying our invention applied to a table. Fig. 2 represents a central horizontal section of the said devices. Fig. 3 represents a side elevation of the central portion of the mold containing the matrix for molding the washers. Fig. 4. represents a side elevation of the portion of the mold containing the matrix for the pipe tacks. Fig. 5. represents a side elevation of said central portion of the mold on the opposite side from that shown in Fig. 3. Fig. 6. represents a central vertical section of the devices as shown in Fig. 1. Figs. 7 and 8 represent central vertical sections of the rings used to form the different sized washers. Fig. 9. represents the product of the washer mold, showing different sized washers that are molded, and Fig. 10. represents the product of the tack mold.

A in the drawings represents the central portion of the mold having the washer matrix $a$ formed on one side thereof and a separating ridge $l$ and studs $k, k$, formed on the other side. This central portion is provided with a lip or extension A' having screw holes for securing it to a bench or other convenient place, or the lip can be clamped in a vise mounted on a bench. The matrix $a$ is hollowed out of one side of this portion of the mold and is circular in form and of a depth equal to the required thickness of the washer to be molded. The ring forming the walls of this matrix is partially cut away as at $a^2$ to form a channel or ingate by means of which the molten lead or other soft metal can be poured into said matrix. This matrix is adapted to receive different sized rings $b$ for molding different sized washers, and these rings are clamped in place by a screw C engaging a screw threaded lug $c$ on the wall of said matrix and by being screwed down bears against the said ring $b$. Other smaller rings $b'$ are also adapted to be slipped over a stud $c'$ of said portion A and clamped thereon by a washer $c^2$ engaged by a screw $c^3$ which in turn engages a screw threaded recess in said stud $c'$.

The rings $b$ are of the same external diameter as shown in Fig. 7, but the apertures cut in their centers are of varying diameters so that different sized washers may be molded by simply inserting the required size of ring. These rings $b$ are for molding the peripheries only of the washers, the rings $b'$ being adapted to mold the central apertures of the same.

The rings $b'$ are of varying external diameter as shown in Fig. 8, so that any sized aperture may be molded in the washer, but we prefer to use the largest ring $b'$ with the ring $b$ having the largest aperture and the next largest ring $b'$ with the next largest ring $b$ and so on.

Each of the rings $b$ is provided with a groove $b^2$ which, when the ring is in position in the mold, coincides with the groove $a^2$ so as to form one continuous groove or ingate to the matrix from the outside, whereby the molten metal can be run into the matrix.

The portion D of the mold is simply a flat plate provided at its center with a stud $d$. A screw threaded passage $d'$ passes through this stud and the plate, and when the plate is placed against the rings, see Fig. 2, the head of the screw $c^3$ and the washer $c^2$ will enter enlargements of the said passage and thereby prevent the said plate from moving or shifting its position with regard to said matrix. A hollow handle F having a threaded end is adapted to be screwed into said passage $d'$ so that said plate can be conveniently handled during the molding operation. A small space on the periphery of the plate D that coincides in position with the passage or ingate $a^2$, is beveled as at $f$ so as to form a funnel shaped ingate into which the molten metal can be readily poured.

All of the foregoing description relates to that part of the mold for casting the washers only; the pipe tacks being molded on the opposite side of the portion or plate A by means of a plate D' which is adapted to mold two tacks at the same operation.

This mold is formed with two matrices $g$ divided along its center by a groove $g'$ having inclined walls. See Fig. 6. This groove divides the mold into two matrices and each of these matrices is provided with two mound shaped projections $h$ terminating at their apexes in studs $h'$, which form apertures in the molded tacks, and the projections $h$ form counter sunk recesses for the heads of screws to be passed through said apertures when the tacks are applied to a pipe. The outer walls of these tack matrices are given any desired shape and are made of a depth sufficient to equal the required thickness of the finished tacks. These matrices are also each provided with passages $i, i$ having flaring mouths to form ingates for introducing the molten metal into the same. Air vents $i'$ are also provided to allow the escape of any heated air that may be trapped in the matrix, and thus prevent any bubbling at the passage $i$ by said air seeking to escape at these points during the operation of molding.

The plate D' is provided with apertures $j$ for engaging studs $k, k$, on the portion A and said plate is adapted to be placed against the portion A and said studs will then prevent any lateral movement of the same. A wedge shaped ridge $l$ on said portion or plate enters the groove $g'$ when said parts are put together but does not completely fill the said groove, leaving unoccupied spaces on each side thereof, which spaces form inclined flanges $m$ on the finished tack. The plate D' is provided on its back with a screw threaded stud $n$ adapted to engage a hollow handle $f'$ for removing said matrix when the mold is complete.

During the operation of molding when both molds are in use, the two plates D and D' are held by the handles against the rigid central portion or plate A, and the metal poured into the matrices where it cools immediately. The plates D and D' are then removed by means of the hollow handles, and the washers and tacks removed from the matrices.

The washers and tacks are intended principally for plumbers' and gas fitters' use, but of course may be used for other purposes. The washers are used to surround a pipe where it passes through a floor, and the tacks are used to attach the pipes to walls and the like.

Our invention will be found of great convenience in plumbers' shops as with its use a large amount of time and labor in the manufacture of washers and tacks are saved, and more practical and desirable products produced than those made heretofore by hand. Where the washers are made by hand, comparatively thin sheet lead must be employed in order to be able to stamp or cut out the washers. Because of this fact, serious inconvenience is experienced in the use of such hand made washers, as for instance in making a wipe joint, as the washer becomes cooled before a perfect joint is formed, whereas with the use of our mold thicker washers can be made which will hold the heat a sufficient length of time for a perfect wipe joint to be formed.

What we claim as our invention is—

1. A compound mold for making washers and pipe tacks for plumbers' use, comprising in its construction a central plate or section having an ingate to receive molten metal and provided on one of its faces with a matrix for forming washers of different diameters and having different sized bores and its other face forming one half of the pipe tack mold, a removable interchangeable center core ring for forming the bore of the washer, and a removable, interchangeable, outer core ring for forming the periphery of the washer and two suitable removable plates or sections forming respectively the other half of the washer mold and the pipe tack mold, an independent ingate for conducting molten metal to the pipe tack matrix, whereby one matrix can be used without the other, substantially as described.

2. A mold for making washers, comprising two sections or plates, one of the sections being provided with a matrix for forming washers of different diameters, an outer removable interchangeable imperforated core ring for forming the peripheries of washers of different diameters, a peripherally located screw for securing said ring in position by bearing against its periphery, a central core for forming the bore of the washer, and an ingate for the passage of molten metal to the matrix, substantially as described.

3. A mold for making washers for plumbers' use comprising two sections or plates, one of the sections being formed with a matrix for forming washers of different diameters, a removable ring secured in said matrix, means for securing said ring in position, a central removable ring, a stud for securing said ring in position, and an ingate for the passage of the molten metal to the matrix, substantially as described.

4. A closed mold for making washers for plumbers' use constructed of two sections or plates, one of the sections being formed with a matrix for forming washers of different diameters, ring matrices of the same diameter but having different sized bores adapted to be secured in the outer edge of said matrix for forming the periphery of a washer, means for securing any one of said matrices in position, ring matrices of different diameters but having the same sized bores adapted to be secured in the center of said matrix for forming the bores of the washers, means for securing any one of said matrices in position, and an ingate for the passage of molten metal to the matrix, substantially as described.

5. A mold for making washers for plumbers' use, comprising two sections or plates, one of the sections being provided with a matrix for forming washers having their outer peripheries of the same diameter but with different sized bores, an outer core ring for forming the outer periphery of the washer, a centrally supported interchangeable, removable core ring for forming the bore of the washer, means for securing the inner core ring in position, and an ingate for the passage of molten metal to the matrix, substantially as described.

6. A compound mold for making washers and pipe tacks for plumbers' use comprising in its construction a plate or section having an ingate to receive molten metal, and provided on one of its faces with a matrix for forming washers, and its other face forming one half of a pipe tack mold, a removable interchangeable outer ring secured in the washer matrix and an inner removable outer interchangeable core ring secured in said washer matrix for forming respectively the outer periphery and the bore of the washer; and two suitable plates or sections, the faces of which form respectively the other half of the washer mold and the pipe tack mold, substantially as described.

In testimony whereof we hereunto affix our signatures in presence of two witnesses.

DAVID R. BLACK.
STEPHEN A. HILL.

Witnesses:
EDWARD BLAKE,
W. A. SEELY.